J. A. BOW, P. THILL & A. E. WHEELER.
FURNACE BINDING.
APPLICATION FILED DEC. 17, 1914.

1,193,109.

Patented Aug. 1, 1916.
7 SHEETS—SHEET 1.

WITNESSES:
Harry A. Bennes
Jos. A. Michel

INVENTORS.
James A. Bow,
Peter Thill
Archer E. Wheeler.

BY

ATTORNEY.

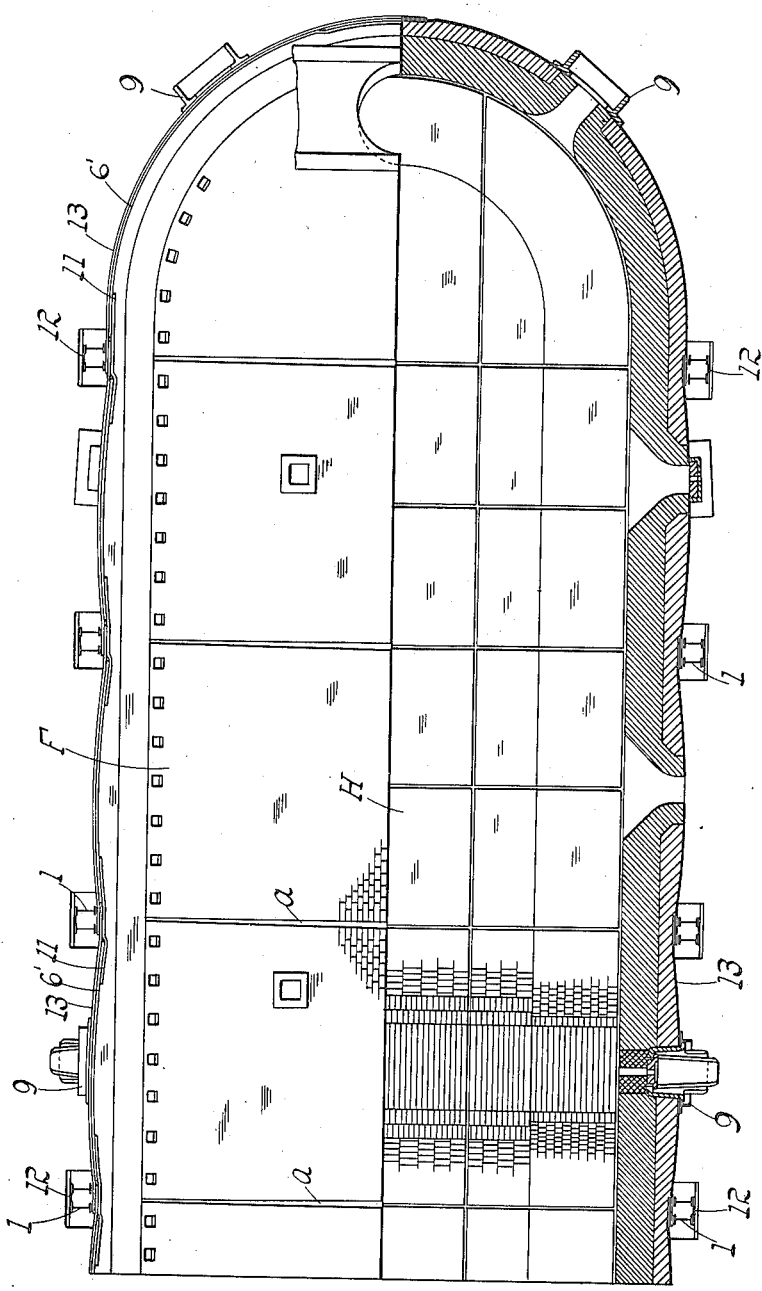

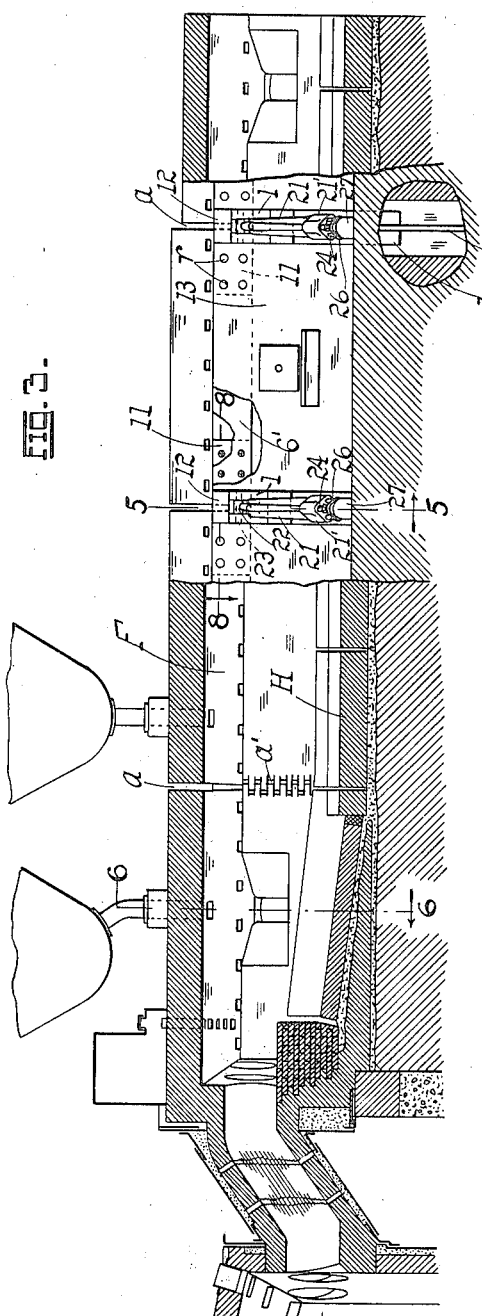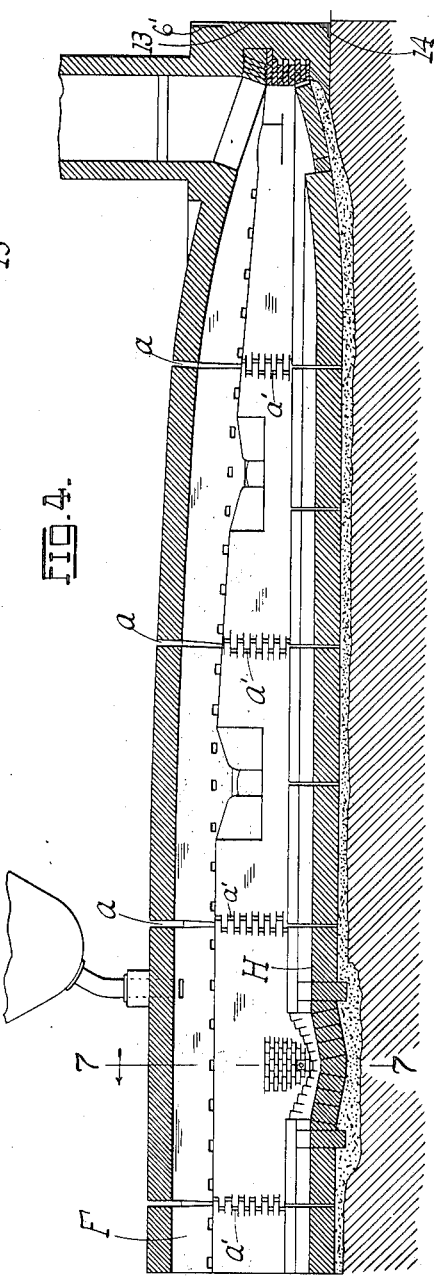

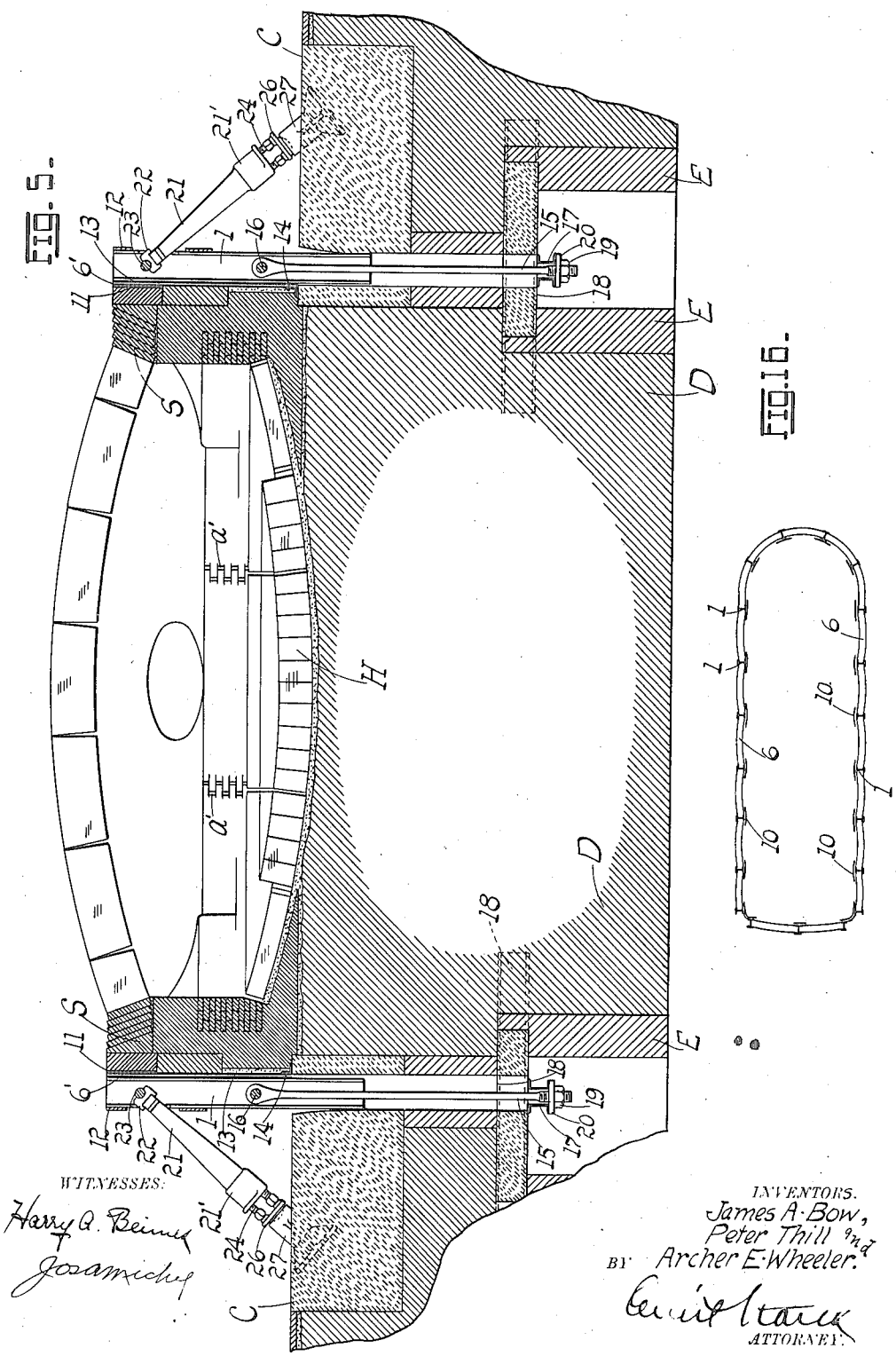

J. A. BOW, P. THILL & A. E. WHEELER.
FURNACE BINDING.
APPLICATION FILED DEC. 17, 1914.

1,193,109.

Patented Aug. 1, 1916.
7 SHEETS—SHEET 5.

WITNESSES:
Harry A. Beimes
Jos Amxichef

INVENTORS.
James A. Bow,
Peter Thill and
Archer E. Wheeler.

BY
Ernst Stana
ATTORNEY.

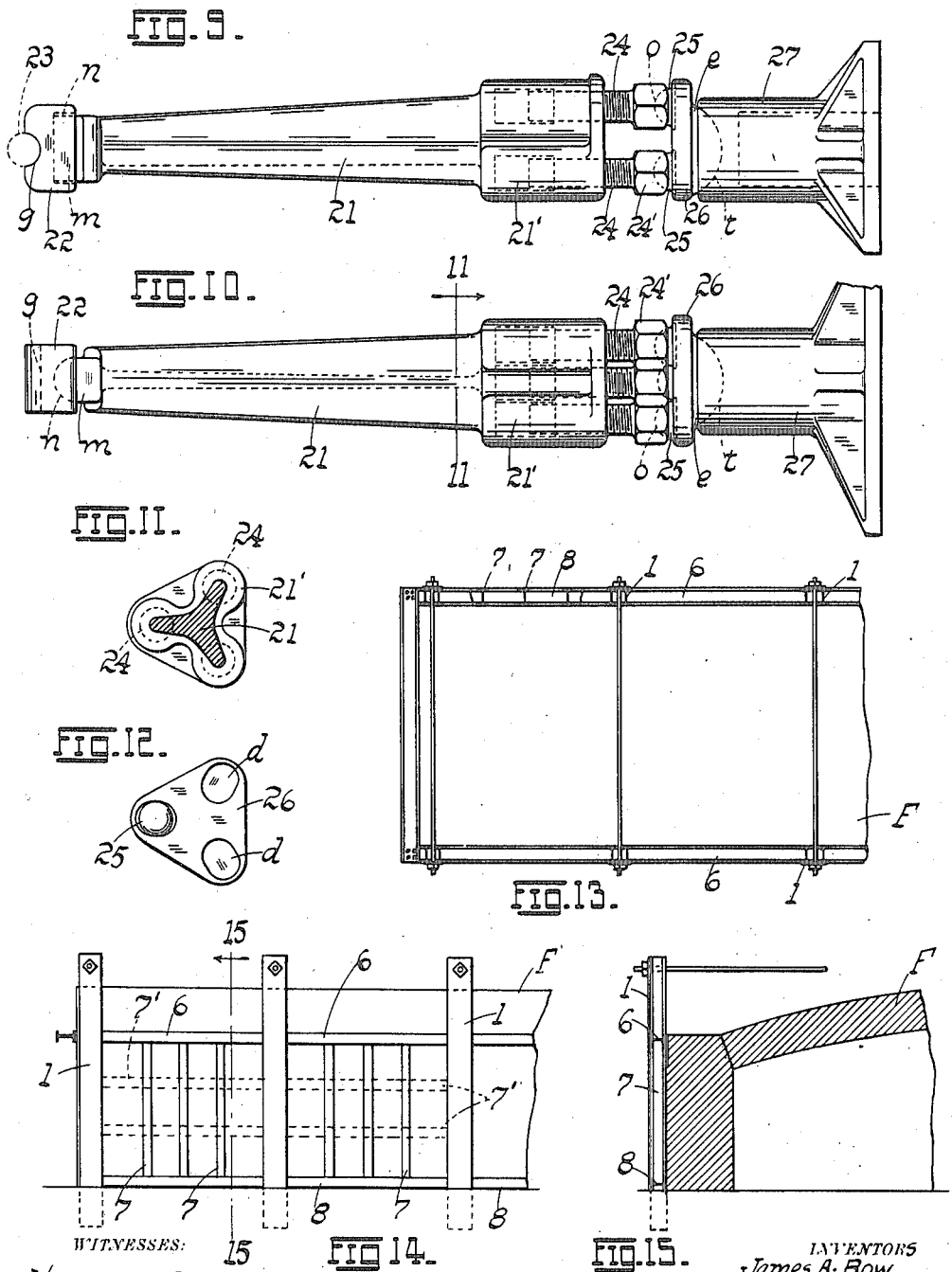

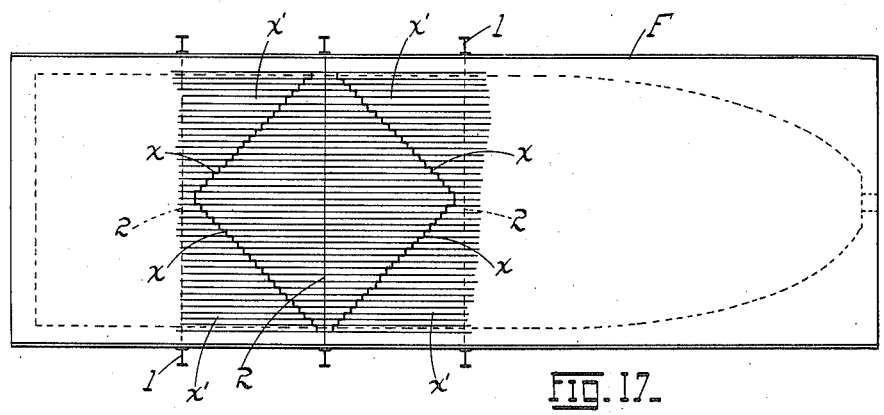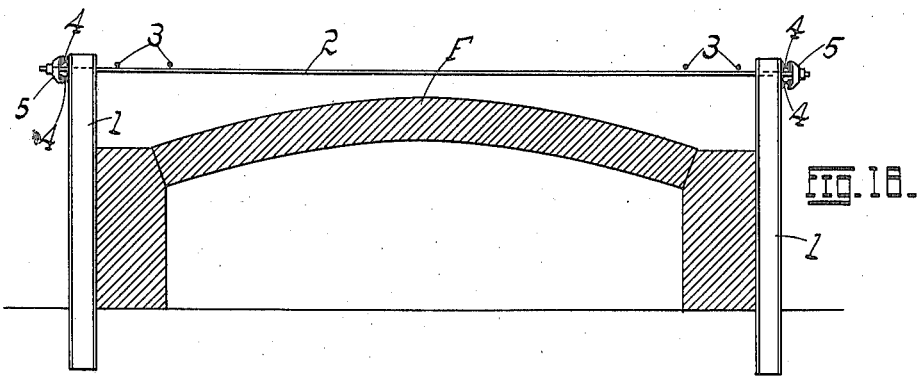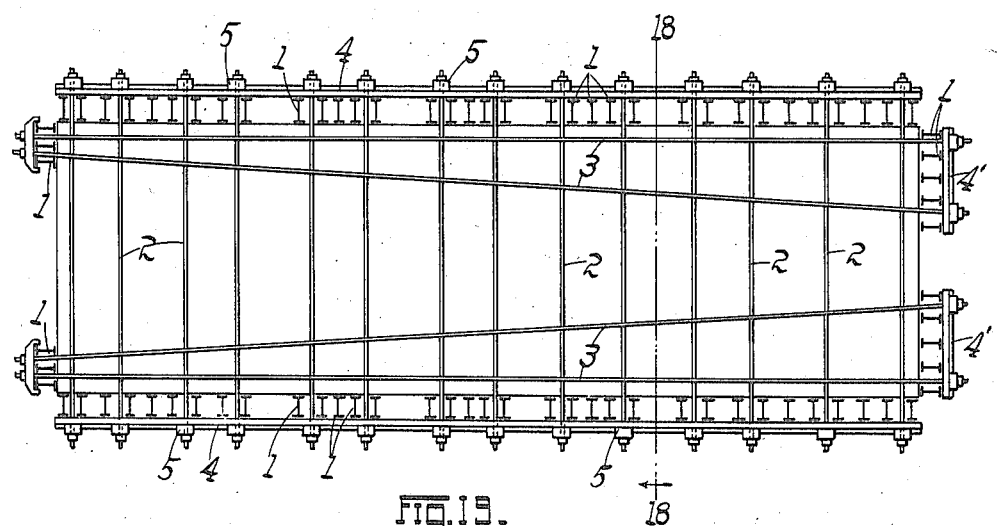

UNITED STATES PATENT OFFICE.

JAMES A. BOW AND PETER THILL, OF GREAT FALLS, MONTANA, AND ARCHER E. WHEELER, OF LONDON, ENGLAND.

FURNACE-BINDING.

1,193,109.

Specification of Letters Patent.

Patented Aug. 1, 1916.

Application filed December 17, 1914. Serial No. 877,707.

*To all whom it may concern:*

Be it known that we, JAMES A. BOW, PETER THILL, and ARCHER E. WHEELER, citizens of the United States, the said JAMES A. Bow and PETER THILL residing at Great Falls, in the county of Cascade, State of Montana, and the said ARCHER E. WHEELER residing in London, England, have invented certain new and useful Improvements in Furnace-Bindings, of which the following is a full, clear, and exact description, reference being had to the accompanying drawings, forming a part hereof.

Our invention has relation to improvements in furnace bindings; and it consists in the novel features of construction more fully set forth in the specification and pointed out in the claims.

Figure 1:
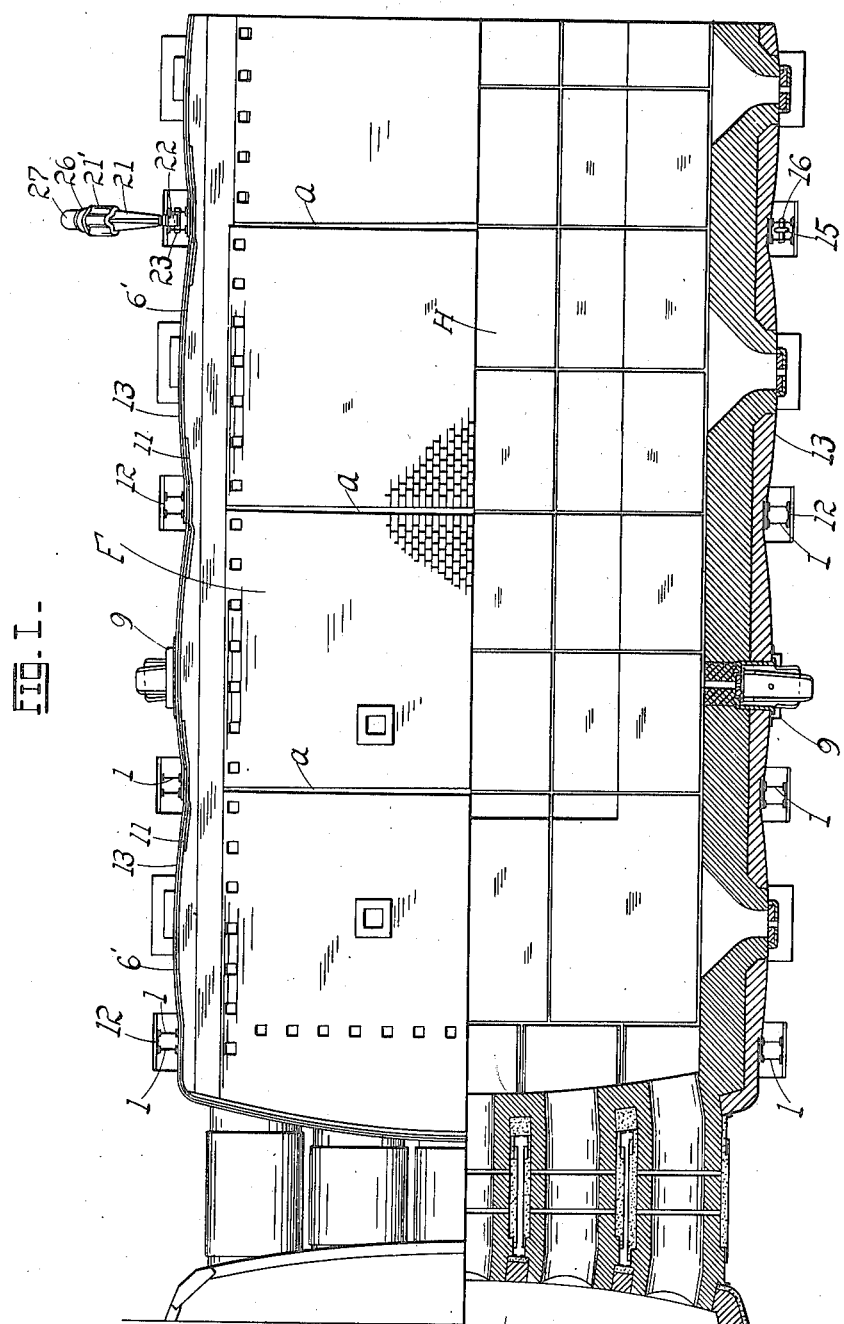
Figure 6:
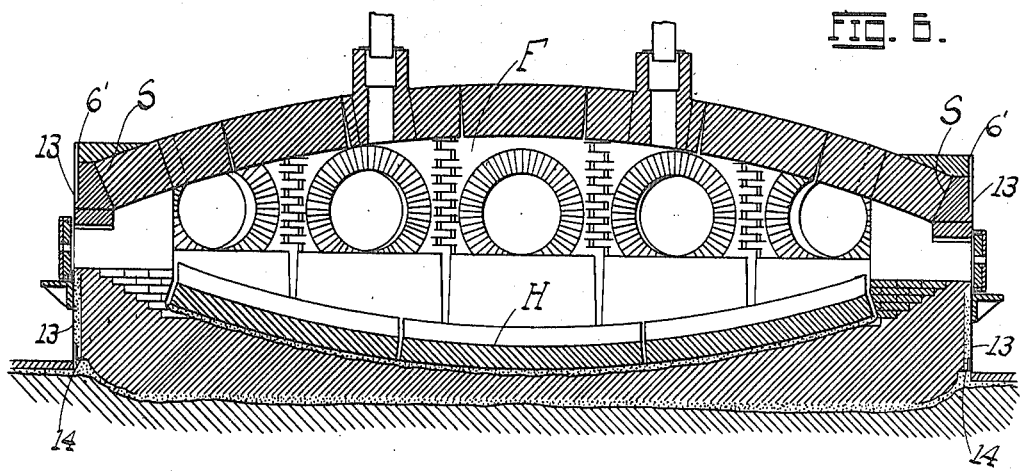
Figure 7:
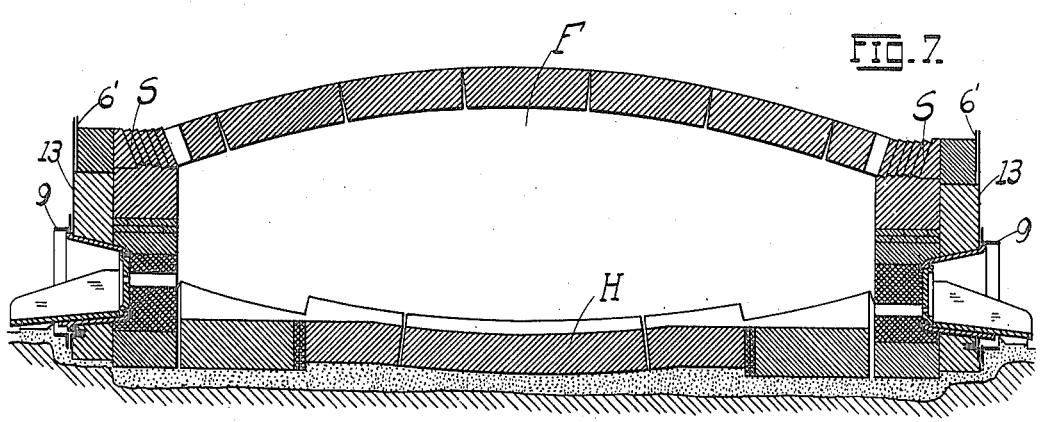
Figure 8:
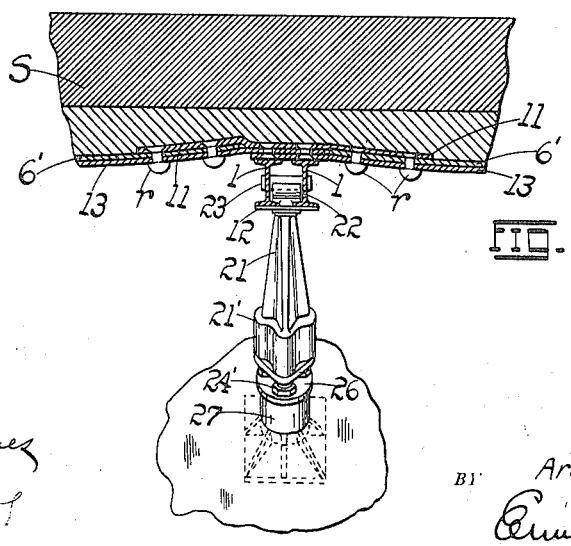

In the drawings, Figure 1 is a combined top plan and a horizontal section taken below the skew-back of one-half of a reverberatory furnace, showing our invention applied thereto, with some of the parts omitted; Fig. 2 is a similar view of the complementary half or continuation of the portion of the furnace shown in Fig. 1; Fig. 3 is a middle vertical longitudinal section of the half of the furnace shown in Fig. 1 with parts in side elevation; Fig. 4 is a middle vertical longitudinal section of the half shown in Fig. 2; Fig. 5 is an enlarged vertical cross-section on the line 5—5 of Fig. 3; Fig. 6 is a vertical cross-section on the line 6—6 of Fig. 3; Fig. 7 is an enlarged vertical cross-section on the line 7—7 of Fig. 4; Fig. 8 is an enlarged horizontal sectional detail on the line 8—8 of Fig. 3; Fig. 9 is a face view of the adjustable strut for the buckstay; Fig. 10 is a view of the strut taken at right angles to Fig. 9; Fig. 11 is a cross-section on the line 11—11 of Fig. 10; Fig. 12 is a top plan of the equalizer member of the strut, detached; Fig. 13 is a top plan of the modification shown in Fig. 14; Fig. 14 is a side elevation of a modified form of binding in which the wall is reinforced between buckstays by struts extending from the skew-back to a bottom stiffening member; Fig. 15 is a vertical cross-section on the line 15—15 of Fig. 14; Fig. 16 is a diagrammatic plan of a form of binding showing the skew-back beams secured to the buckstays and spliced together; Fig. 17 is a diagrammatic plan of a reverberatory furnace showing the diagonal cracks or open seams in the roof which result from insufficient or improper support of the roof by opposing buckstays; Fig. 18 is a vertical cross-section on the line 18—18 of Fig. 19 illustrating conventionally the old form of binding; and Fig. 19 is a top plan of the old form of binding.

The present invention is directed to the buckstaying or binding of metallurgical furnaces, and particularly those of the reverberatory furnace type; and has for its object (1) to reduce the quantity of material entering into the binding of furnaces as now generally constructed; (2) to prevent what may be termed "secondary" expansion of the furnace, or that resulting from the heating of a cooled furnace which at some time previous had undergone a first heating and a consequent initial or "primary" expansion; (3) to provide a binding in which a single element combines the functions of two or more elements under the old forms of buckstaying; (4) to provide a continuous wall-support or casing disposed as a tension plate around the walls of the furnace, to take care of a primary expansion, and to prevent a secondary expansion; (5) to provide for said casing an extra reinforcing band or skew-back support, operating as a tension member for taking the extra stress of the skew-back thrust; (6) to provide means for anchoring the casing against upward displacement with any vertical expansion of the furnace walls; (7) to provide a binding of substantially uniform design so as to equalize as much as possible the tension thereof at all points, under a stress due to expansion of the furnace, and to maintain a substantially uniform coefficient of expansion throughout; (8) to proportion the buckstays so that two opposing stays may serve to support a section of roof whose length is substantially equal to the width of the roof or dimension thereof between said opposing stays; (9) to provide a plate or casing the horizontal curve of which between consecutive buckstays shall conform to the longitudinal stress in the plate due to the thrust of the skew-back; (10) to provide a series of adjustable struts engaging the buckstays whereby the latter may be accurately adjusted to the thrust of the skew-back; and (11) to provide further and other features, and apply other principles of construction the advantages of which will be apparent from a detailed description of the invention, which is as follows:

Referring to the drawings, F represents a reverberatory furnace with arched roof, A the fire box, H the hearth, and S the skewback; the whole resting on a foundation D preferably of poured slag, bounded by brickwork E and a concrete floor C. The features alluded to are well understood so far as their general character is concerned and in themselves form no part of our present invention. In order to understand the invention however, it will be necessary to give a brief description of some of these features of construction with special reference to the buckstaying or binding. As is probably known, the hearth of the furnace may be a bed of granulated silica, or other suitable refractory material, which will have no expansive effect upon the binding when under the influence of heat; or it may be an inverted arch (as shown) which may have more or less thrust upon the side and end walls, and hence upon the binding. The side walls are usually provided with some form of vertical expansion joint in the brick-work to take up the longitudinal expansion due to heat. But in many of the usual forms of expansion joint in actual use there is very little "take up", and hence considerable longitudinal expansion of the furnace. This must be accompanied by loosening of nuts or turnbuckles in the binding to prevent breakage of same. As will be shown later, it would not be practicable to make the binding of sufficient strength to actually prevent the longitudinal expansion of the walls unless the expansion joints referred to were such as to close up under reasonable force. That which pertains to the side walls with regard to expansion applies with equal force to the end walls. But the principal part of the furnace to be taken care of in the matter of expansion, and the part that requires practically all of the attention during the heating up and the cooling down periods, is the roof.

The roof is a continuous arch, extending from one end of the furnace to the other. The usual rise is one inch per foot of span. The thickness usually ranges from 9 to 20 inches. In some cases the thickness is uniform for the entire length of the furnace and in others it is thicker at the combustion end where it wears out more rapidly. It is constructed of bricks set on end, or radially; so that the length of the brick represents the thickness of the roof, which is never more than one brick in thickness. Instead of the bricks being all wedges, which would be theoretically correct, they are about 80 per cent. straights and 20 per cent. wedges. The wedges are, of course, all in courses by themselves, and the wedge courses are uniformly spaced among the straights, and, obviously sufficiently beveled to compensate for the straights. This use of both wedges and straights is due to practical reasons, and for all practical purposes the roof is just the same as if constructed of all wedges. At any rate, it is of no importance in the scheme of our invention. In all furnaces the relation of the rise of the arch to the thickness of the roof and the span is such that in expanding under the influence of heat, if the skew-backs were held, or not be let out, the arch would go up, so that the skew-back thrust can not increase with expansion. The longitudinal expansion of the roof is taken care of by expansion joints $a$ at intervals extending across the roof from skew-back to skew-back. These expansion joints are clear, straight openings extending through the roof, several inches in width. They are covered during the heating up of the furnace, and until they close by expansion, by bricks laid across on top, spanning the opening. As these expansion joints are clear openings right across there is no resistance in the closing up of same from the expansion of the brick-work, such as in the case of the usual expansion joints in the walls. And these roof expansion joints are sufficient to take care of all longitudinal expansion of the roof; so that this element of furnace expansion does not enter into the binding problem at all.

The most important part of the problem of furnace binding is that which deals with the lateral, or cross, expansion of the roof. And in order to understand one of the features of this problem which feature is of importance in this invention, it will be necessary to explain the usual method of laying the brick, or to be more correct, the arrangement of the brick in the usual method of laying same. The brick range in size from the standard 9"x4½"x2½" to 20"x6"x3". The different sizes, of course, are not mixed, that is, any given thickness of roof is constructed of only one sized brick, except with such variations as will be described later. As stated before, the brick are laid on end, or lengthwise with the radius of the arch, and with the next longest dimension of the brick longitudinally with the furnace. They are laid in continuous courses lengthwise with the furnace, with the exception of being interrupted at the cross expansion joints $a$ previously mentioned. The thickness of these courses represents the thickness of the bricks. Between expansion joints the bricks in every course break joints with the bricks in the courses on each side. The expansion joints are straight and unbroken across the roof, and the edges are kept straight by having the brick next to the expansion joint in every alternate course, on both sides of the expansion joint, half as wide again as the other bricks. Thus, this wide brick to "break bond" for a 9 inch roof would be 9"x6¾"x2½" instead of 9"x4½"x2½". (See Fig. 1 and Fig. 2). Thus the roof is divided into sections constructionally, each section being that portion between two expansion joints *a*. Each section being bonded throughout by the bricks, all breaking joints, act more or less independently, or as a unit in expanding and contracting. But the expansion joints in the roof may close up tight, and then the different sections would not act independently, but the whole roof would act as a more or less flexible unit.

When the furnace is heated up (which process should be done gradually, and made to extend over a period of a week or two) the walls and the roof expand. The walls are allowed to expand upwardly freely, only being resisted by the weight of the roof and the friction against the buckstaying at the skewback due to the thrust of the arch. The longitudinal expansion of the walls may be prevented by having the binding of sufficient strength to force the vertical expansion joints *a'* in the walls to close. Or the walls may be allowed to expand longitudinally and the binding let out accordingly, to prevent breakage. The longitudinal expansion of the roof is taken care of, as stated before, by closing of the roof expansion joints.

As intimated previously the most important feature of the furnace expansion in the process of heating up is the lateral, or cross, expansion of the roof. If the buckstays are not let out in accordance with this expansion, of course all of such expansion will be manifested in the rising of the roof. But before going any further it will be advisable to examine more in detail the nature of the heating and expansion of the roof and its results. The temperature of the furnace inside is raised to about 2,800 deg. F., and the under side of the roof is raised to approximately this temperature. But the upper or outside of the roof, due to the non-conducting property of the brick, does not get heated beyond a temperature of 300 deg. or 400 deg. F. Therefore, as will be evident, the individual bricks expand to a much greater extent at the lower end than at the upper, and the adjustment of the buckstays to let out the skew-backs must be made to suit the condition of greatest expansion, which is on the under side of the roof. Because even at the high temperature to which the brick is subjected at the lower, or inner end, it does not soften or compress; but has sufficient strength to cause the arch to rise unduly if not allowed to expand laterally by letting out the skew-backs. Thus, through the widening of the roof to correspond with the expansion of the inner ends of the bricks, the upper side of the roof opens up at the joints between bricks. In other words, the bricks will be in contact only at their lower ends. This will evidently produce in the roof a condition of what could properly be called unstable equilibrium. When the roof is built, the bricks are all laid in contact for their full length from top to bottom. This makes the arch rigid, the degree of rigidity depending, of course upon the span of the arch, and the depth of same, or the length of the brick. Now, if the roof were heated up uniformly all through, as well as all over the entire area of same, and the skew-backs were let out to correspond to the expansion (of course there would necessarily be a slight rise of the roof any way to correspond with the increased span) the bricks would all remain in contact from top to bottom, the same as before heating. There would be no opening of joints in the upper side of roof, and it would be just as rigid as before heating, but this is only a hypothetical case of expansion. It never occurs thus; but always with the inside at a temperature greatly in excess of that of the outside. And in such a case it is impossible practically to so adjust the skew-backs as to keep the bricks in contact from top to bottom, and therefore impossible to prevent the condition of what has been called unstable equilibrium. Now, experience shows that there is very little uniformity in the movement of the roof during the heating up process; more often than otherwise it rises the greatest amount in the center. But the point of greatest rise is apt to be some distance off the center, making the arch unsymmetrical; and if not properly taken care of, is apt to settle unduly on the opposite side. If allowed to settle too much at any point, of course the roof could collapse at that section. Even with the arch rising symmetrically, it sometimes settles too much on each side and would cause collapse of the roof if not taken care of in time. The rising of the arch tends to vary more or less, at different sections along the roof. This erratic behavior of the roof is in accordance with the condition of unstable equilibrium referred to. Any undue rise at any point in the roof is easily taken care of by placing a strut (or small timber) on the high point in the roof, with the upper end of the strut against a beam or any fairly rigid part of the structure above the furnace; or even against the buckstay tie rods. It does not take a great deal to resist the further movement of the arch at the high spot, and any further rise would have to occur in another part of the cross-section. Or a low part of the roof could be forced up by strutting against the high part in the same cross-section and forcing the skew-backs in by tightening on the cross tie rods. Sometimes when the furnace is "down" and cold, a low part of the roof is raised by a screw jack from the inside. A method of providing expansion joints in the under side of the roof has been developed and put into practice, which eliminates to a great extent the condition of unstable equilibrium of the roof when heated up and expanded, and even eliminates the necessity of letting out the skew-backs. After a furnace gets heated up to its working temperature, expansion ceases, and the roof does not move any farther. The buckstaying requires no further attention until the furnace is to be cooled down again. Then operations must be reversed, the skew-backs forced in by tightening the rods as the brick-work contracts until the furnace is cooled down completely.

The foregoing illustrates part of the problem of handling the roof. But before going any further, a brief description of ordinary buckstaying will be given, in order to make clear, by comparison, the novelty of the binding which is the subject of the present invention.

The ordinary reverberatory furnace binding, or buckstaying, consists of a series of I-beams (buckstays) 1, placed vertically, from several inches to several feet apart, around the outside of the furnace, (Figs. 18, 19), with tie rods 2 connecting the upper ends of the I-beams across the top of the furnace. The lower ends of the I-beams or buckstays extend below the floor line, usually two feet or more, and are held from being forced outward either by tie rods extending through underneath the furnace connecting the I-beams on opposite sides; or by abutting against the ground which is made specially solid for this purpose. The I-beams are spaced farther apart where door and tap holes occur. The I-beams or buckstays, at the ends of the furnace are connected by tie rods 3, which extend the full length of the furnace. These end buckstays do not assist in supporting the roof but only serve to restrict the longitudinal expansion of the walls of the furnace. The side buckstays with the cross tie rods 2 are the vital part of the binding as far as adjustment and maintenance of the roof is concerned. The buckstays are held at the top and at the bottom against the thrust of the roof skewback, and are thus vertical beams. There is usually a channel, or other structural shape (not shown) extending along the outside of the furnace wall at the skew-back line, and against which the buckstays bear in order to distribute the pressure. The cross tie rods are spaced several feet apart, and to distribute the load of each tie rod over several buckstays, a couple of rails 4 are provided, extending longitudinally at the upper end of the buckstays.

Now, this is the point in the description at which it is opportune to explain an important feature in the relationship between the maintenace of the roof, or arch, and the pressure of the buckstays on the skewbacks. As just explained, the buckstays are placed usually close together along the sides (except at doors and tap holes), and the tie rods connecting the upper ends of buckstays, across the furnace, are spaced a few feet apart—probably four or five feet, or more. And to again repeat, the pull of the tie rods is applied to the buckstays through the medium of a couple of rails 4 extending longitudinally along the outside of the buckstays close to the top of same. The ends of the tie rods go between these rails and through a large washer 5 which clamps over the rails. Thus, although the tie rods are spaced several feet apart, they hold all the buckstays between, as shown in Figs. 18 and 19. The strength of the buckstays and of the tie rods is supposedly such that when all are stressed about equally they are capable of holding the thrust of the skewback with safety. This equal stressing is maintained by adjustment of the individual tie-rods. Assuming now, a certain distance between tie-rods, say four feet: If the roof were constructed of four foot sections and the sections not connected together (say an expansion joint $a$ extended across from skew-back to skew-back between sections), then each tie rod would have only its own four foot section to hold. And presuming a certain amount of flexibility in the skew-back construction the tightening or loosening of any tie rod would not affect the tension of the tie rods on either side of it, but would simply act to raise or lower the four foot section of roof or arch under the tie rod in question (within the limits of the flexibility of the skew-back, of course). Thus each tie rod, with its buckstays, could only take its share of the skew-back thrust, and could not be overloaded, provided it was designed in accordance with the statement made previously that when all tie rods and buckstays are equally stressed they are capable of holding the skew-back thrust with safety. It must be understood, of course, that the rise of the arch must never at any time be allowed to go below a certain point, or in other words, the arch must never be allowed to get too flat, as it could obviously easily reach a point at which no buckstaying or binding could be made strong enough to prevent its collapsing. The flatter the arch is allowed to become, the greater the strain upon the tie rods and buckstays.

Having just considered the case of the roof being constructed in such a manner as to give a flexibility which would make the tie rods all take their share of the load at all times, within the limits of practicable adjustment, let us now consider the opposite extreme, in which the whole roof is rigid longitudinally; that is, all bonded together from one end to the other without any cross expansion joints. The roof would still have lateral flexibility; that is, the arch could rise or fall according as the skewbacks went in or out, or as the brickwork were allowed to expand or contract by changes of temperature. But the whole length of the roof would have to rise or fall together. And if the adjustments were made by the manipulation of the buckstays, all would have to be adjusted together, because if one or more of the tie rods were lengthened out all the load from the thrust of the skew-backs would fall upon the remainder of the rods. (Of course, in actual practice the tie rods are really adjusted one at a time; but each is adjusted only a small amount at a time so as to prevent too great a variation in the stress in any of them. And in the course of a general adjustment such as takes place in the heating up or cooling down of the furnace a good many rounds are made). Now this case of a longitudinally rigid roof, i. e., rigid for the full length, is impracticable in any but a furnace which is very short for its width, and never occurs in large modern copper reverberatories. And, as will be seen by a study of the roof construction, if the ratio of the length of the roof to the width is beyond a certain amount, it would be impossible to bond the brick together so as to make the roof longitudinally rigid, or in other words, act as a unit, from one end to the other. It must be explained, of course, that the only forces utilized in keeping the brick-work together are those of the attraction of gravity and of pressure; there is no cement used that would give the bonding any appreciable tensile strength. So that the problem is now to see what length of roof can be bonded together to give longitudinal rigidity, with the usual way of laying the bricks, and also what length of roof is usually made a rigid unit in actual practice. In the first place, with regard to the method of laying the roof brick, this has already been described and need not be repeated. But it will be recollected that the bricks are placed edge to edge in longitudinal courses, and that the bricks in every course break joints with those in the course on each side, or in other words, they break bond every course. Now suppose the roof were built with these courses continuous throughout; that is, without any cross expansion joints, such as $a$, and assume that one of the cross tie rods 2 (say one at a suitable distance from either end of the furnace) were to be left in tension, and the tie rods on both sides of this first tie rod were slackened unduly, then there would result the condition of attempting to hold a considerable length of the roof by pressure on two opposite points on the skewbacks. The result would be lines of failure, or cracks $x$, $x$, as shown in Fig. 17, the zig-zag lines spreading in both directions from the points of skew-back pressure representing the lines along which the roof would crack. And the portion within the four zig-zag lines $x$, $x$, would be maintained by the single tie rod 2, while the remainder of the roof would fall away as the tie rods on either side are slackened. These lines of failure make an angle of substantially 45 degrees with the skew-back, or with the center line of the furnace. This will be obvious when it is recollected that the joints of each course are midway between those of the courses on either side, and that the thickness of the brick is equal to half the width. (In case of the 9" brick this is not exactly true, the lines of failure would make a greater angle with the skewback, as the thickness of the brick is greater than half the width). It is hardly necessary to make any attempt to explain why the lines of failure branch out from the point of support. A study of the conditions of bonding of the brick will make this obvious. It will be noticed that these lines of failure start at some distance on either side of the point of pressure of the buckstay, depending upon what length of skew-back is supported by the single tie rod. The length of roof at the ridge that would be supported by a single tie rod, is a little greater (except in the case of the 9" brick perhaps) than the width of the furnace (Fig. 17); and with the sizes and shapes of bricks usually employed in roof construction, this would be the greatest possible length of roof that could throw its weight on a single tie rod, provided, of course, that the number of buckstays that were held by a single tie rod were not such as to unduly increase the length of supported skew-back. Of course the diamond shaped area included within the lines of failure $x$, is practically the only portion of the roof supported by the single tie rod. But the four triangular corner portions $x'$ needed to complete the section of roof that is represented in length by the distance between the intersecting points on the center line, would add a comparatively small amount to the thrust upon the skew-back, as a mathematical investigation would show. Any way, it would perhaps be the best practical way to assume that the greatest length of roof that could depend upon a single tie rod would be that equal substantially to the width of the furnace.

Now experience shows, that the maintenance of satisfactory uniformity in the tension of the tie rods can not be depended upon. The result is that in the course of time the buckstays get badly bent, and the tie rods occasionally break. Although as previously stated, the buckstays and tie rods are usually designed so that with reasonable uniformity of stress they are safe against overloading; nevertheless in order that the binding would be perfectly safe against overstressing, each of the tie rods should be designed to take the weight of the greatest length of roof that could come upon it, and the buckstays designed accordingly. But with the usual style of binding, with the buckstays and tie rods so close together, this would mean a tremendous increase in the amount of steel work, and add considerably to the cost of the furnace. Now to overcome this difficulty, among others, and to give the binding the necessary strength and security as illustrated, is one of the principal objects of our invention. The principle by which this is accomplished will now be described: Suppose, instead of placing the buckstays a few inches, and the tie rods about four or five feet, apart, as is the present practice, they were both spaced a distance apart equal to about the width of the furnace, which would be 25 feet or more in the large modern furnaces. Then suppose, they were designed to take with safety the load of the 25 ft. or more of roof that would be allotted to each pair of buckstays and tie rod. Then, as has just been demonstrated, they would be designed to take the greatest practicable load that could come upon them, and they would be loaded close to their maximum safe capacity at all times, and they would never, or could never, be overloaded, unless, as shown before, the roof were allowed to get too flat. (And as previously stated, if this condition were allowed to come to pass, no binding could be made strong enough to prevent the collapse of the roof. But such a condition could only result through gross carelessness, and would be entirely inexcusable.) With the binding designed as described, there would be no surplus material; hence, if it is not already obvious, investigation would show that in addition to the items of greater safety and foolproofness, in the matter of economy the new system would compare favorably with the old, and in fact to the advantage of the new. Of course, other considerations in the design of the binding, or in the arrangements about the furnace might require that the distance between buckstays be made much less than the maximum amount stated; in fact, in actual practice it would probably be advisable to reduce this distance by one half, or more.

As to maintaining the skewback and that part of the side walls between the buckstays, all that is necessary is to provide beams 6 between the buckstays, at the skewback line, to take the horizontal thrust of the skew-back, the ends of the beams to be attached to the buckstays. (See Fig. 14.) Thus the entire length of skewback is taken care of. That portion of the walls between the buckstays, and below the skew-back beams, would, in the course of time, fail by bulging outward, unless provided with frequent supports on the outside. In the old style of binding the buckstays themselves provide this support. But in our new style of binding, with buckstays a long distance apart and a beam along the skew-back line only, the wall is supported either by a series of small upright members 7 or their equivalents attached, at the top to the skewback beam 6 and at the bottom to a special floor member 8 (Fig. 14) or, by a series of horizontal stiffeners 7′, to and between adjacent buckstays. Where doors or tap holes occur, special frames 9, preferably of cast iron, are provided, and attached to the binding in any suitable mechanical manner (Figs. 1, 2, 7,). Thus the entire longitudinal walls and the roof, as far as the binding is concerned, are taken care of.

So far very little has been said about the end buckstays and the longitudinal tie rods 3 connecting same in the old construction. As stated before, this part of the binding is not to hold the roof, but just to limit the longitudinal expansion of the walls, and to assist in holding the furnace together generally. But before going into the method of longitudinal binding as developed in our invention it will be opportune to explain the reason, or the necessity for it. And in conjunction with this explanation another important principle in furnace expansion and contraction under extremes of temperature will be brought out. In the first place, with regard to one of the ordinary phenomena of furnace expansion, aside from the part the roof plays: When the furnace is heated up for the first time, there is an expansion in all directions. The walls expand longitudinally, and (with the ordinary style of binding) the end buckstays 1 must be let out, or the tie rods 3 would be broken. This action of the furnace depends upon the condition that if there are any "expansion joints" in the walls they are designed, as is usually the case, in such a way that the force required to close them is greater than can be brought to bear by the ordinary style of binding. When the furnace cooled down again (at the end of the campaign, which may be of several months duration) it does not contract. Then when it is heated up again, after such repairs as were necessary, are made, new pressure comes upon the binding, and it is let out again, and so on, the furnace keeps "growing" with each campaign. Of course the side buckstays 1 and cross tie rods 2 which hold the roof, are let out and taken up again with each expansion and contraction; but this part of the binding is not being considered at present. An explanation of this phenomenon, and of the method of overcoming this continuous "growing" will be most easily made by taking a portion of the furnace wall as an illustration. Imagine a portion, or section, of furnace wall, as ordinarily constructed; a portion in which there are no expansion joints, and that all the bricks are laid close together, with very thin joints of fire clay, or silica, mortar (which is the usual practice). The bricks are all bonded together horizontally in both directions in every course, and every course breaks joints with the courses above and below it. But vertically there is no bond; or in other words, the courses are simply laid one upon another as in any ordinary brick construction. In fact the whole method of construction is similar to that of a wall in any brick building, with the exception that the cross bonding is more thorough and the joints are much thinner. Now, when the furnace, and hence this section of wall, is heated up the bricks expand. (Of course the inside bricks, that is the bricks on the inside face of the wall, being the hottest, expand the most). And as the bricks are laid as close together as possible the expanding of the bricks of necessity expands the wall. This might be called the "initial" expansion of the brickwork. To prevent this expansion would require a force greater than can be applied by any of the usual styles of buckstaying, or binding; and greater than can be applied by any binding that would come within reasonable practical strength. Because obviously, it would have to be strong enough to crush the brickwork. Thus it would be better not to have the binding of such strength; and in fact, it would not be of essential importance to prevent this "initial" expansion anyway. This initial expansion is taken care of in practice by two expedients. One is to provide expansion joints $a'$ in the walls at intervals, although in many cases these expansion joints are so designed and constructed that they are of little use, as it takes too great a force to make them close up. The other expedient is to slacken the binding according to the necessities of the case. This invention provides an additional method which involves a different principle, which will be explained in due time. Now, as long as the temperature of the furnace is maintained, after this first heating up, and initial expansion, the dimensions will remain constant, and there will be no further change in the section of wall in question. But, when the furnace is cooled down, the wall does not contract horizontally, although the bricks will all contract in all directions individually. The reason for this action is the weak cohesive and adhesive properties of the mortar that is used in furnace construction. It requires a positive force to pull or push the bricks together as they contract; and unless this force is supplied by the binding, the wall does not contract. Of course the wall will contract vertically, due to the force of gravity, unless prevented on account of other conditions, which will be dealt with later. In consequence of this contraction of the individual bricks, but non-contraction of the wall as a whole, there obviously results a condition in which the bricks may be considered as separated horizontally by minute spaces, or vertical cracks. But, as intimated before, there are no horizontal cracks, for the obvious reason that the force of gravity keeps the wall together vertically.

We have now reached the condition in which the furnace had been heated up and expanded, and then cooled down, but not contracted, although the individual bricks have all contracted, and consequently are separated by minute vertical cracks. Now, if the bricks were not bonded together horizontally, but were simply laid up in vertical piles, with the vertical joints continuous (which method of constructing the walls would be impractical) the vertical cracks of course, would be continuous; and when the furnace was heated up the second time the bricks would expand and these vertical cracks would close up, and theoretically and practically there would be no additional expansion of the wall as a whole. But, due to the fact that the bricks are bonded together horizontally, when they expand again due to heat, if the section of wall in question is held against further expansion as a whole there must obviously be a slipping of the bricks on each other, accompanied by considerable frictional resistance. Or in other words, the action of the bricks of the different courses upon each other corresponds in principle to that of a multiple disk clutch. So that, although there are slight vertical cracks separating the bricks from each other, due to the previous contraction, the bricks would not slide together and close up these cracks unless the wall were held at the ends to prevent expansion as a whole. Rather, the frictional resistance, due to the "multiple disk clutch" action mentioned, would tend to force the wall as a whole to additional expansion; and with the second cooling down, and contraction of the bricks, and the third heating up, there would be still further expansion of the wall. And so on, with each successive cycle of cooling down and heating up the wall, a furnace, if not resisted by the binding would increase in dimensions, or would what might be termed, "grow". This expansion of the wall or furnace, due to the "multiple disk clutch" action just described might be termed "secondary" expansion. The "initial", or primary expansion, previously mentioned, it will be recollected, is the expansion of the wall or furnace resulting from the first heating up of the brickwork, when all the bricks are in contact, horizontally as well as vertically, and to resist which expansion too much, would necessarily crush the bricks. Now although, as stated before, this primary expansion of the brickwork is an action which it would not be practicable to prevent, the secondary expansion can be, and should be prevented, if it is desirable to keep the furnace in proper and lasting condition. And, although the usual style of binding is generally not made strong enough to resist this secondary expansion, the binding designed according to the principle of our present invention can very easily be made so. One of the important features of our new binding, is, that whereas in the old system of binding for each function of the expansion process, separate members in the binding system are provided to take care of same, in the new system certain members are made to combine the functions of two or more members of the old system. To illustrate: In the old system, with regard to the longitudinal tie rods 3 and end buckstays 1, they perform no other function than that above specified, that is to say, to limit the longitudinal expansion of the walls and to assist in holding together the furnace generally. Also, the longitudinal rails 4 at the top of the buckstays 1, and the corresponding rails 4' at the top of the terminal buckstays 1, for distributing the load of the tie rods, perform no other function. And again, the skew-back rails, or channels 6 (or whatever shape is used there) perform no other function than to distribute the pressure of the buckstays along the skew-back and keep same in alinement. Now, although one of these elements, viz., the rails 4 (4') at the top of the buckstays are not used in the new system, the other two elements, viz., the skewback support 6 and the longitudinal tie rods 3, have their functions combined in one, to wit, the skew-back support. And in the accomplishment of this, of course, the skewback support is made a continuous piece 6' right around the furnace. It is designed of sufficient tensile strength to resist "secondary expansion", and very little extra material is required to make it perform the additional function of skew-back support. There are various ways in which this member 6' may be designed, two of which will now be dealt with: (1) In the description of the portion of the new system of binding which so far has been explained, to wit, the portion which takes care of the longitudinal walls and the skewback, it will be recollected that the scheme embodied a series of buckstays 1 a considerable distance apart, with beams 6 between, to support the skew-backs. Now, in order to make these skew-back beams perform the additional function of a longitudinal tie, they would have to be all spliced together and would have to be attached to the binding which would continue around the ends of the furnace. This method of designing the binding is illustrated in Fig. 16, in which the splice is represented by the numeral 10 and would be quite practicable; but a further improvement is embodied in the present invention to wit: (2) In consideration of the principle of making the skew-back support serve as a longitudinal tie, and taking advantage of the fact that the skew-back support would thus be in tension, instead of making the support on the "beam" principle, it is made on the suspension bridge principle. Thus, the skew-back support consists of a steel band 6' extending entirely around the furnace, the ends of the furnace being rounded or partially so. The band is composed of sections spliced together opposite the buckstays 1, the splices being indicated by the numerals 11 (Figs. 3 and 8); and while the band is shown as disconnected from the buckstays, it may if desired, be connected thereto as in the form described in Fig. 16. The buckstays 1 act as abutments, being preferably disposed in pairs on opposite sides of the furnace, a pair of I-beams (or their equivalents, of which the buckstays are composed) affording an extended bearing for the furnace wall as shown. In the present embodiment of our invention each pair of buckstays or I-beams are connected by an outer plate 12, thus making practically a single buckstay or structural member of the two I-beams, the walls of the furnace, and the band 6' between the buckstays curving or convexing outwardly the desired amount to take the thrust of the skew-back (Figs. 1, 2, 16). In other words, the horizontal curve of the band (and the outer casing or plate to be presently described) should be such as to correspond to the longitudinal stress in the plate due to the skew-back thrust. The continuous band 6' referred to does not prevent the "letting out" of the buckstays (if it be desired) to correspond with the lateral expansion of the roof, under increased temperatures. In the present embodiment of our invention the elastic tension band principle is carried a step further by providing the walls of the furnace with an outer casing or continuous steel plate or shell 13 extending around the furnace walls from top to bottom, the said casing being composed of sections connected to the corresponding sections of the skew-back support 6' by the splices 11 aforesaid, the casing sections conforming in curvature to the curved or convexed sections of the walls between successive buckstays (Figs. 1, 2, 16). Of course suitable openings are cut in this casing for observation doors, skimming doors, tap holes and gas inlets, these features being well understood in the art. By curving the plate or casing sections right down to the floor, or the full height of the furnace wall, warping of the plate is prevented and the necessity for stiffeners such as 7, 7', is dispensed with. The band 6' of course serves as a reinforcing member for the upper portion of the casing or that opposite the skew-back to take the skew-back thrust; the whole plate or casing serving as a longitudinal tie to hold the furnace against what has been previously referred to as "secondary" expansion. The casing should not of course prevent, nor is it designed to prevent, "primary" expansion, but the same is proportioned to prevent its stretching under the "primary" expansion referred to, beyond its elastic limit, thereby leaving it available to serve its function to hold the furnace against the secondary expansion. In designing the outer casing care should be exercised to have the same of uniform strength throughout as nearly as possible so that all portions shall be subjected to substantially uniform stretch with the stresses to which the same is subjected under the expansion of the furnace due to a rise in temperature. In other words, no portion of the casing with its splices, rivets, and the like should be weakened to the breaking point in any elongation or stretch which it may suffer under the expanding thrust of the furnace. It may be stated in passing that the "primary" expansion could be taken care of by providing a compressible material such as mineral wool (not shown) at one or both ends of the furnace between the brickwork and outer shell or casing.

It would be impracticable to construct horizontal expansion joints in the brickwork to prevent the skew-backs, and hence roof, from being carried up by the vertical expansion of the wall, so that this action is not prevented. But there is a tremendous pressure on the binding at the skew-back line, due to the thrust of the roof, or arch, and in the vertical expansion of the walls the friction against the binding due to this pressure would lift the same were provision not made for the brick at the skew-back line to slide upward upon it. Otherwise, if the binding were carried up it would not come down to its original place when the furnace cooled, and each additional campaign of the furnace would carry it farther up until the furnace was practically ruined. This anchoring down could be accomplished by having the buckstays securely anchored in the foundation, and the shell attached to the buckstays; but a simpler method is utilized by providing the shell with a suitable shelf or angle 14 all around the bottom of the inside, as shown (Figs. 5, 6). The brickwork which is built against the shell rests on this shelf (angle) and in expanding presses downward as well as upward and thus keeps the binding from rising. To reduce the friction between the furnace walls and the shell thereof during the expansions and contractions of the walls under variable degrees of temperature, the rivets $r$ which serve to connect the shell 13, splices 11, and skew-back supporting band 6' together, are counter-sunk, leaving a comparatively smooth surface of contact between the walls of the furnace and the shell. The walls are thus left free to play over the shell in their expansions and contractions.

It is of course desirable that suitable provision be made not only for anchoring the buckstays to the foundation or floor, but to provide means for letting out or taking up the buckstays according to the expansion of the roof. One method of anchoring the buckstays is by means of anchor bars or ties 15 secured at their upper ends to pins 16 supported between the members of each pair of buckstays 1, the bars leading down between the buckstays between a pair of structural members or channels 17, 17, below the buckstays, the members 17, 17, being held down by transverse members 18 embedded in the foundation D. The lower end of each anchor rod is screw threaded, a nut 19 passed over the same engaging the plate or washer 20 bearing against the members 17 (Fig. 5). By a proper adjustment of the nuts any degree of tension may be imposed on the ties or anchors 15. To let out or take up the buckstays, we provide suitable adjustable struts or jacks 21 disposed at an incline to the buckstay (or rather pair of buckstays). The strut terminates at one end (the upper end) in a substantially semi-cylindrical formation $m$, which engages a corresponding semi-cylindrical cavity or depression $n$ on one face of a cap-piece 22, the opposite face of the cap-piece being provided with a semi-cylindrical groove $g$ whose axis is disposed at right angles to that of the depression $n$, said groove engaging a cylindrical pin 23 mounted between the members of the pair of buckstays 1. This arrangement prevents axial rotation of the strut during any longitudinal adjustment or extension of the same as clearly obvious from the drawings. This adjustment is effected by a series (three in the present example) of adjusting screws 24 disposed angularly equal distances (120 degrees) apart and equidistant from the axis of the strut, the threaded portions of the screws operating in screw-threaded sockets in the basal portion 21' of the strut, the outer polygonal heads 24' of the screws terminating in semi-spherical depressions $o$ which are engaged by the corresponding surfaces of suitable semi-spherical bearings 25 whose flat faces rest on the bottoms of suitable radially disposed slots or depressions $d$ formed on the outer face of an equalizer member 26, the inner or opposite face of the equalizer being provided with a semi-spherical formation $e$ adapted to rest in a corresponding semi-spherical depression or seat $t$ on the upper end of a base 27 resting on, and secured in any mechanical manner to, the floor C, (or equivalent fixed support). The slots $d$ are disposed in a plane at right angles to the axis of the strut at equal distances from said axis, and spaced angularly equal distances apart. Preferably the geometric center of the semi-spherical formation $e$ of the equalizer lies in the plane of the centers of the semi-spherical bearings 25 when deposited in their slots or depressions $d$, or in other words, in the plane of the bottoms of said slots. The screws 24 may be manipulated independently by applying a wrench or lever to the heads 24' thereof and the strut 21 may be thus adjusted longitudinally to and from the members 1, 1, taking up or letting out said members according to the thrust of the skew-back and weight of roof to be supported. It will be obvious that the specific construction of the strut not only permits longitudinal adjustment of the same for the purpose hereinbefore specified, but the flexible or jointed character of the same at each end permits the strut to readily yield to both longitudinal and lateral movements of the furnace walls and of the outer casing or shell 13 with variations of temperature. The equalizer 26 forms an admirable joint for the purpose here sought.

Features shown but not alluded to are well known in the art and require no description in the present connection.

Having described our invention what we claim is:

1. In combination with a furnace having an arched roof and supporting walls therefor, a series of buckstays distributed at intervals around the walls and terminating at the top of the walls, a fixed support, and flexible means carried by said support for maintaining the upper portions of the buckstays in permanent engagement with said walls.

2. In combination with a furnace having an arched roof and supporting walls therefor subjected to an outward thrust, a series of buckstays disposed at intervals along the walls, the latter convexing outwardly between the buckstays, tension bands interposed between the buckstays and furnace wall and engaging the walls along the skew-back, the horizontal curve of the convexed portions of the walls between the buckstays and of the engaging bands conforming to the longitudinal stress to which the walls and bands are subjected.

3. In combination with a furnace having an arched roof and supporting walls therefor subjected to an outward thrust, a binding for the walls provided with a series of buckstays distributed along the walls and spaced apart, a skew-back beam or member interposed between consecutive buckstays, a series of upright reinforcing members disposed along the walls between the buckstays, and secured at the top to the skew-back beam, and means independent of the furnace walls for rigidly holding the lower ends of said reinforcing members in a fixed position.

4. In combination with a furnace having an arched roof and supporting walls therefor, a binding enveloping the walls, and a continuous tension band independent of the binding disposed opposite the line of the skew-back and operating to reinforce the thrust at the skew-back.

5. In combination with a furnace having a roof and substantially parallel supporting walls therefor subjected to a lateral outward thrust, the walls having a series of outwardly curved sections, and buckstays disposed along the walls in the depressions between said curved sections.

6. In combination with a furnace provided with a roof and supporting walls therefor, buckstays disposed along the walls at intervals, and a casing or shell operating as a tension member and having portions curved outwardly between the buckstays for taking the arch thrust at the top of the walls.

7. In combination with a furnace having a roof and supporting walls therefor, a shell incasing the walls and anchored against upward displacement, said shell comprising a series of spliced sections secured by rivets having heads countersunk on the side facing the furnace, whereby the furnace wall may readily slip along the shell during expansions and contractions of the wall with the changes in temperature.

8. In combination with a furnace of the character described, a series of buckstays distributed at intervals about the walls of the furnace and anchored against vertical displacement, and flexible struts set at an angle to the buckstays and engaging the buckstays with one end, the opposite ends of the struts bearing against a fixed support.

9. In combination with a furnace of the character described, a series of buckstays distributed at intervals about the walls of the furnace and anchored against vertical displacement, and adjustable struts set at an angle to the buckstays and engaging the latter with one end, the opposite ends of the struts bearing against a fixed support or abutment.

10. In combination with a furnace of the character described, a binding for the furnace walls, and struts set at an incline to the walls and engaging the binding, said struts being flexible to yield in response to expansions and contractions of the furnace in different directions.

11. In combination with a furnace of the character described, a binding for the furnace walls, and inclined struts bearing against the walls and binding, said struts being flexible to respond to longitudinal and transverse expansions and contractions of the furnace.

12. In combination with a furnace of the character described, a binding for the furnace walls, and inclined, longitudinally adjustable, axially non-rotatable struts engaging the walls, said struts being flexible to respond to longitudinal and transverse expansions and contractions of the furnace with variations of temperature.

13. In combination with a furnace of the character described, a binding for the furnace walls, inclined, axially non-rotatable struts engaging the walls, said struts being flexible to respond to longitudinal and transverse dimensional variations of the furnace, and adjusting screws for varying the lengths of the struts.

14. In combination with a buckstay, a strut provided with a terminal substantially semi-cylindrical formation, a cap-piece having a corresponding cavity or depression engaging said formation, and provided with a semi-cylindrical groove opposite said depression with the axis of the groove disposed transversely to the axis of the depression, a pin on the buckstay engaging said groove, and means for supporting the opposite end of the strut.

15. In combination with a furnace of the character described, a series of buckstays or abutments disposed at suitable intervals apart around the furnace walls, tension members spanning the spaces between consecutive buckstays opposite the skew-back and curved outwardly to conform to the stress imposed therein by the thrust of the skewback.

16. In combination with a furnace of the character described, a series of buckstays disposed about the walls of the furnace, and tension members or ties coupled thereto and to a fixed support for holding the buckstays against vertical displacement.

In testimony whereof we affix our signatures in presence of two witnesses.

JAMES A. BOW.
PETER THILL.
ARCHER E. WHEELER.

Witnesses for James A. Bow and Peter Thill:
  M. A. PESTANA,
  ROY A. LaMOTT.

Witnesses for Archer E. Wheeler:
  F. W. SNOW,
  J. E. KIDD.